US012243262B2

United States Patent
Kehl et al.

(10) Patent No.: US 12,243,262 B2
(45) Date of Patent: Mar. 4, 2025

(54) APPARATUS AND METHOD FOR ESTIMATING DISTANCE AND NON-TRANSITORY COMPUTER-READABLE MEDIUM CONTAINING COMPUTER PROGRAM FOR ESTIMATING DISTANCE

(71) Applicant: TOYOTA JIDOSHA KABUSHIKI KAISHA, Toyota (JP)

(72) Inventors: Wadim Kehl, Tokyo-to (JP); Hiroharu Kato, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 17/930,826

(22) Filed: Sep. 9, 2022

(65) Prior Publication Data
US 2023/0102186 A1    Mar. 30, 2023

(30) Foreign Application Priority Data
Sep. 27, 2021    (JP) ................................ 2021-156991

(51) Int. Cl.
*G06T 7/50*    (2017.01)
*G06T 3/4007*    (2024.01)
(Continued)

(52) U.S. Cl.
CPC .............. *G06T 7/73* (2017.01); *G06T 3/4007* (2013.01); *G06V 10/7715* (2022.01)

(58) Field of Classification Search
CPC ..................... G06T 7/73; G06T 3/4007; G06T 2207/20084; G06V 7/593;
(Continued)

(56) References Cited

U.S. PATENT DOCUMENTS 10,949,684 B2 *    3/2021    Jaipuria ............... G05D 1/0221
11,288,828 B2 *    3/2022    Wu ......................... G06V 10/25
(Continued)

FOREIGN PATENT DOCUMENTS

| JP | 2004005596 A | 1/2004 |
| JP | 2010044740 A | 2/2010 |
| JP | 2020004219 A | 1/2020 |

OTHER PUBLICATIONS

F. Andert, "Drawing stereo disparity images into occupancy grids: Measurement model and fast implementation," 2009 IEEE/RSJ International Conference on Intelligent Robots and Systems, St. Louis, MO, USA, 2009, pp. 5191-5197, doi: 10.1109/IROS.2009.5354638. (Year: 2009).*

(Continued)

*Primary Examiner* — Sean M Conner
*Assistant Examiner* — Ronde Lee Miller
(74) *Attorney, Agent, or Firm* — Dickinson Wright, PLLC (57) ABSTRACT

An apparatus for estimating distance according to the present disclosure extracts feature maps from respective images including a reference image and a source image; projects a source feature map extracted from the source image onto hypothetical planes to generate a cost volume; sets sampling points on a ray extending from the viewpoint of the reference image in a direction corresponding to a target pixel in the reference image; interpolates features of the respective sampling points, using features associated with nearby coordinates; inputs the features corresponding to the respective sampling points into a classifier to calculate occupancy probabilities corresponding to the respective sampling points; and adds up products of the occupancy probabilities of the respective sampling points and the distances from the viewpoint of the reference image to the corresponding (Continued)

sampling points to estimate the distance from the viewpoint of the reference image to a surface of the object.

8 Claims, 6 Drawing Sheets

(51) Int. Cl.
*G06T 7/73* (2017.01)
*G06V 10/77* (2022.01)
*G06V 20/56* (2022.01)

(58) Field of Classification Search
CPC ...... G06T 2207/30261; G06V 10/7715; G06V 10/764; G06V 20/64
See application file for complete search history.

(56) References Cited

U.S. PATENT DOCUMENTS

| | | | | |
|---|---|---|---|---|
| 11,380,002 | B2* | 7/2022 | Shu | G01C 21/3804 |
| 11,462,030 | B2* | 10/2022 | Ram | G06V 20/64 |
| 11,669,972 | B2* | 6/2023 | Hu | G06V 10/82 |
| | | | | 348/148 |
| 2003/0198377 | A1 | 10/2003 | Ng | |
| 2010/0040279 | A1 | 2/2010 | Yoon et al. | |
| 2020/0005476 | A1 | 1/2020 | Nishiyama | |
| 2021/0065393 | A1* | 3/2021 | Jeon | G06T 7/593 |
| 2021/0365699 | A1* | 11/2021 | Hu | G06V 10/82 |
| 2023/0102186 | A1* | 3/2023 | Kehl | G06V 10/764 |
| | | | | 382/100 |
| 2023/0398692 | A1* | 12/2023 | Kollar | H04N 13/128 |

OTHER PUBLICATIONS

D. Gallup, J. -M. Frahm, P. Mordohai and M. Pollefeys, "Variable baseline/resolution stereo," 2008 IEEE Conference on Computer Vision and Pattern Recognition, Anchorage, AK, USA, 2008, pp. 1-8, doi: 10.1109/CVPR.2008.4587671. (Year: 2008).*

S. Sengupta, E. Greveson, A. Shahrokni and P. H. S. Torr, "Urban 3D semantic modelling using stereo vision," 2013 IEEE International Conference on Robotics and Automation, Karlsruhe, Germany, 2013, pp. 580-585, doi: 10.1109/ICRA.2013.6630632. (Year: 2013).*

Y. Hong, J. Zhang, B. Jiang, Y. Guo, L. Liu and H. Bao, "StereoPIFu: Depth Aware Clothed Human Digitization via Stereo Vision," 2021 IEEE/CVF Conference on Computer Vision and Pattern Recognition (CVPR), Nashville, TN, USA, 2021, pp. 535-545, doi: 10.1109/CVPR46437.2021.00060. (Year: 2021).*

* cited by examiner

APPARATUS AND METHOD FOR ESTIMATING DISTANCE AND NON-TRANSITORY COMPUTER-READABLE MEDIUM CONTAINING COMPUTER PROGRAM FOR ESTIMATING DISTANCE

FIELD

The present disclosure relates to an apparatus, a method, and a computer program for estimating the distance to an object.

BACKGROUND

An apparatus for estimating distance based on multi-view stereopsis can estimate the distance to an object by reconstructing the three-dimensional structure of the object, using a set of images generated by taking pictures of the object with multiple cameras from different viewpoints.

Japanese Unexamined Patent Publication No. 2020-004219 describes a device for generating three-dimensional shape data representing the shape of an object with voxels of predetermined dimensions set in three-dimensional space.

SUMMARY

When a three-dimensional shape represented with voxels is processed with a computer, memory usage increases on the order of the cube of resolution. Thus, it is difficult to raise the resolution of the three-dimensional structure of an object represented with voxels. Thus, it is not easy to estimate the distance to an object of complex shape appropriately.

It is an object of the present disclosure to provide an apparatus that can estimate the distance to an object of complex shape appropriately with relatively small memory capacity.

The apparatus for estimating distance according to the present disclosure includes a processor configured to extract a reference feature map from a reference image generated by a reference camera for taking a picture of an object from a predetermined reference position and that extracts a source feature map from each of one or more source images respectively generated by one or more source cameras for taking a picture of the object from a position different from the reference position. The reference feature map represents features corresponding to respective pixels included in the reference image whereas the source feature map represents features of respective pixels included in the source image. The processor is further configured to project the source feature map onto hypothetical planes to generate a cost volume in which coordinates on the hypothetical planes are associated with features. The hypothetical planes are hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera. The processor is further configured to: set sampling points on a ray in the cost volume extending from the reference position in a direction corresponding to one of the pixels included in the reference image; interpolate, for each of the sampling points, a feature corresponding to the sampling point, using features associated with coordinates near the sampling point and on some of the hypothetical planes disposed near the sampling point in the cost volume; and input features corresponding to the interpolated sampling points into a classifier to calculate occupancy probabilities corresponding to the respective sampling points. The classifier is trained to output the occupancy probabilities each depending on a feature corresponding to coordinates on one of the hypothetical planes and indicating how likely the coordinates are inside the object. The processor is further configured to add up products of the occupancy probabilities corresponding to the respective sampling points and the distances from the reference position to the corresponding sampling points and that estimates the obtained value to be the distance from the reference position to a surface of the object.

The processor of the apparatus according to the present disclosure preferably weights, in the calculation, occupancy probabilities corresponding to the respective sampling points so that an occupancy probability of a sampling point is weightier as the space between a pair of sampling points adjacent to the sampling point is wider.

In the apparatus according to the present disclosure, the classifier is preferably trained so as to reduce the difference between occupancy probabilities estimated for training sampling points set on a training sampling ray in a training cost volume and an occupancy state calculated from a depth associated with a training pixel. The training cost volume is generated with training data including a training reference image and a training source image that represent a training object and that are captured from different viewpoints. The training sampling ray extends from a viewpoint of the training reference image in a direction corresponding to the training pixel. The training pixel is one of pixels included in the training reference image and is associated with the depth of the represented training object.

In the apparatus according to the present disclosure, the training sampling points are preferably set more densely at a location closer to the depth associated with the training pixel.

In the apparatus according to the present disclosure, the classifier is preferably trained so as to reduce the difference between the occupancy probabilities estimated for the training sampling points and the occupancy state of the training pixel as well as the difference between the depth of the training object calculated from the occupancy probabilities estimated for the training sampling points and the depth associated with the training pixel.

In the apparatus according to the present disclosure, the classifier is preferably trained with the occupancy probabilities estimated for the training sampling points whose coordinate values are modified with values set for the training pixel.

A method for estimating distance according to the present disclosure includes extracting a reference feature map from a reference image generated by a reference camera for taking a picture of an object from a predetermined reference position; and extracting a source feature map from each of one or more source images respectively generated by one or more source cameras for taking a picture of the object from a position different from the reference position. The reference feature map represents features corresponding to respective pixels included in the reference image whereas the source feature map represents features of respective pixels included in the source image. The method further includes projecting the source feature map onto hypothetical planes to generate a cost volume in which coordinates on the hypothetical planes are associated with features. The hypothetical planes are hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera. The method further includes setting sampling points on a ray in the cost volume extending from the reference position in a direction corresponding to one of the pixels included in the reference image; interpolating, for each of the sampling points, a feature corresponding to the sampling point, using features associated with coordinates near the sampling point and on some of the hypothetical planes disposed near the sampling point in the cost volume; and inputting features corresponding to the interpolated sampling points into a classifier to calculate occupancy probabilities corresponding to the respective sampling points. The classifier is trained to output the occupancy probabilities each depending on a feature corresponding to coordinates on one of the hypothetical planes and indicating how likely the coordinates are inside the object. The method further includes adding up products of the occupancy probabilities corresponding to the respective sampling points and the distances from the reference position to the corresponding sampling points to estimate the distance from the reference position to a surface of the object.

A computer program for estimating distance stored in a non-transitory computer-readable medium according to the present disclosure causes a computer to execute a process including extracting a reference feature map from a reference image generated by a reference camera for taking a picture of an object from a predetermined reference position; and extracting a source feature map from each of one or more source images respectively generated by one or more source cameras for taking a picture of the object from a position different from the reference position. The reference feature map represents features corresponding to respective pixels included in the reference image whereas the source feature map represents features of respective pixels included in the source image. The process further includes projecting the source feature map onto hypothetical planes to generate a cost volume in which coordinates on the hypothetical planes are associated with features. The hypothetical planes are hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera. The process further includes setting sampling points on a ray in the cost volume extending from the reference position in a direction corresponding to one of the pixels included in the reference image; interpolating, for each of the sampling points, a feature corresponding to the sampling point, using features associated with coordinates near the sampling point and on some of the hypothetical planes disposed near the sampling point in the cost volume; and inputting features corresponding to the interpolated sampling points into a classifier to calculate occupancy probabilities corresponding to the respective sampling points. The classifier is trained to output the occupancy probabilities each depending on a feature corresponding to coordinates on one of the hypothetical planes and indicating how likely the coordinates are inside the object. The process further includes adding up products of the occupancy probabilities corresponding to the respective sampling points and the distances from the reference position to the corresponding sampling points to estimate the distance from the reference position to a surface of the object.

The apparatus according to the present disclosure can estimate the distance to an object of complex shape appropriately with relatively small memory capacity.

DESCRIPTION OF EMBODIMENTS

An apparatus that can estimate the distance to an object of complex shape appropriately with relatively small memory capacity will now be described with reference to the attached drawings. The apparatus for estimating distance first extracts a reference feature map from a reference image generated by a reference camera for taking a picture of an object from a predetermined reference position, and extracts a source feature map from each of one or more source images respectively generated by one or more source camera for taking a picture of the object from a position different from the reference position. The reference feature map represents features corresponding to respective pixels included in the reference image whereas the source feature map represents features of respective pixels included in the source image. The apparatus then projects the source feature map onto hypothetical planes to generate a cost volume in which coordinates on the hypothetical planes are associated with features. The hypothetical planes are hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera. The apparatus then sets sampling points on a ray in the cost volume extending from the reference position in a direction corresponding to one of the pixels included in the reference image; interpolates, for each of the sampling points, a feature corresponding to the sampling point, using features associated with coordinates near the sampling point and on some of the hypothetical planes disposed near the sampling point in the cost volume; and inputs features corresponding to the interpolated sampling points into a classifier to calculate occupancy probabilities corresponding to the respective sampling points. The classifier is trained to output the occupancy probabilities each depending on a feature corresponding to coordinates on one of the hypothetical planes and indicating how likely the coordinates are inside the object. The apparatus then adds up products of the occupancy probabilities corresponding to the respective sampling points and the distances from the reference position to the corresponding sampling points to estimate the distance from the reference position to a surface of the object.

Figure 1:
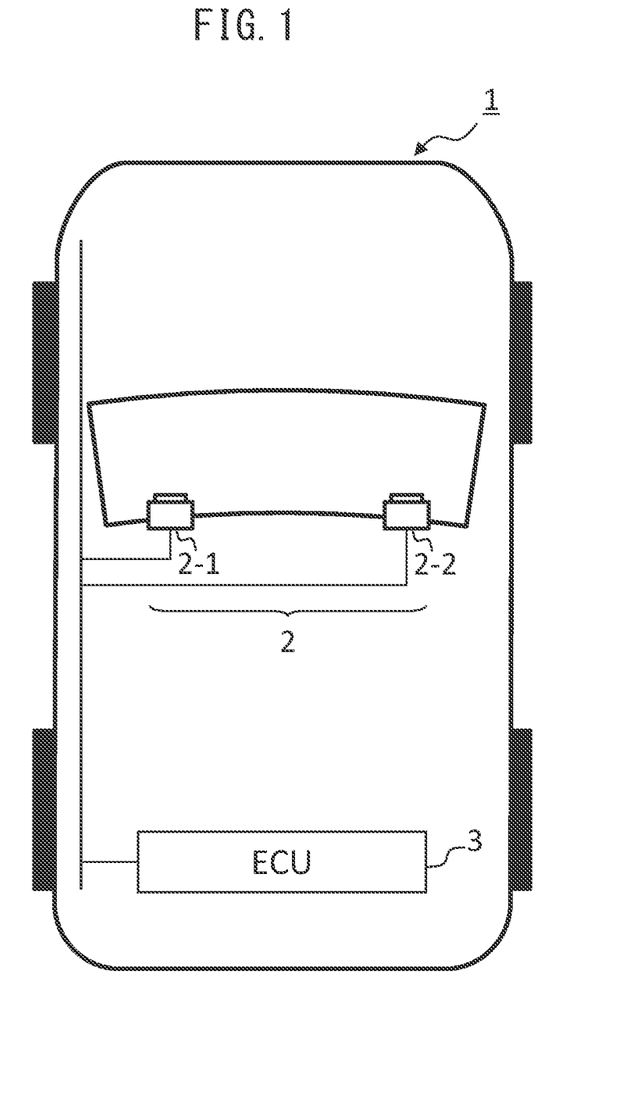
FIG. 1 schematically illustrates the configuration of a vehicle equipped with an apparatus for estimating distance.

FIG. 1 schematically illustrates the configuration of a vehicle equipped with the apparatus for estimating distance.

The vehicle 1 includes cameras 2 for taking a picture of the surroundings, and an electronic control unit (ECU) 3, which is an example of the apparatus for estimating distance. The cameras 2 are connected to the ECU 3 via an in-vehicle network conforming to a standard, such as a controller area network, so that they can communicate with each other.

The cameras 2 are an example of imaging units for generating images of the surroundings of the vehicle 1. The cameras 2 each include a two-dimensional detector constructed from an array of optoelectronic transducers, such as CCD or C-MOS, having sensitivity to visible light and a focusing optical system that forms an image of a target region on the two-dimensional detector. The cameras 2 include a left camera 2-1 and a right camera 2-2. For example, the left camera 2-1 is disposed in a front and upper left area in the interior of the vehicle and oriented forward whereas the right camera 2-2 is disposed in a front and upper right area in the interior of the vehicle and oriented forward. Since they are disposed at different positions in the vehicle 1, the left camera 2-1 and the right camera 2-2 can take pictures of the same object from different viewpoints. The cameras 2 of the present embodiment include two cameras, i.e., the left camera 2-1 and the right camera 2-2; however the cameras 2 may include three or more cameras disposed at different positions. The cameras 2 take pictures of the surroundings of the vehicle 1 through a windshield every predetermined capturing period (e.g., 1/30 to 1/10 seconds), and output images representing the surroundings.

The ECU 3 estimates the distance from a reference position to an object represented in images generated by the cameras 2. Additionally, the ECU 3 predicts a future position of the object, based on the estimated distance from the reference position to the object, and controls a travel mechanism (not shown) of the vehicle 1 lest a future distance between the vehicle 1 and the object fall below a predetermined distance threshold.

Figure 2:
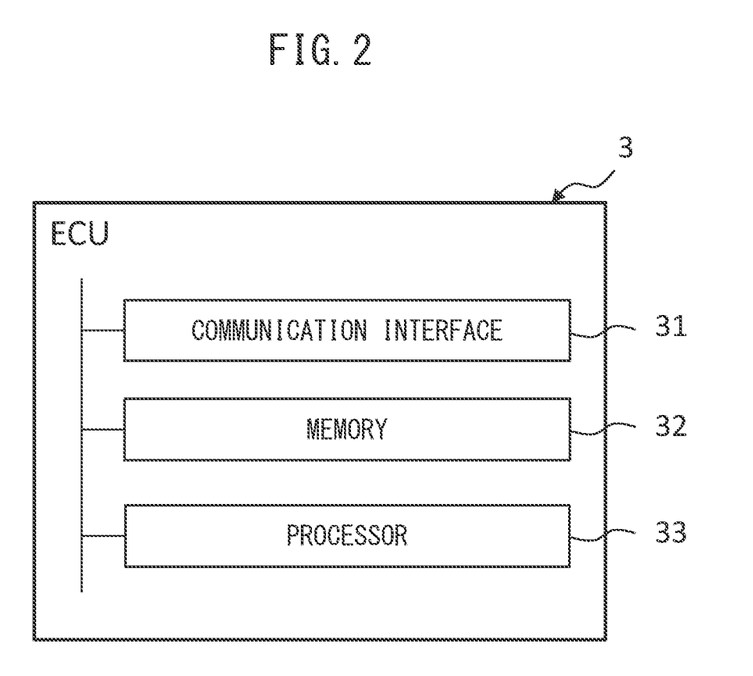
FIG. 2 schematically illustrates the hardware of an ECU.

FIG. 2 schematically illustrates the hardware of the ECU 3. The ECU 3 includes a communication interface 31, a memory 32, and a processor 33.

The communication interface 31, which is an example of a communication unit, includes a communication interface circuit for connecting the ECU 3 to the in-vehicle network. The communication interface 31 provides received data for the processor 33, and outputs data provided from the processor 33 to an external device.

The memory 32, which is an example of a storage unit, includes volatile and nonvolatile semiconductor memories. The memory 32 contains various types of data used for processing by the processor 33, e.g., the locations of the cameras 2, the directions of optical axes of their focusing optical systems, and their focal lengths. The memory 32 also contains a set of parameters for defining a neural network that operates as a classifier for extracting a feature map from an image (e.g., the number of layers, layer configuration, kernels, and weighting factors). The memory 32 further contains a cost volume generated with feature maps as well as a set of parameters for defining a neural network that operates as a classifier for outputting occupancy probabilities corresponding to coordinates included in the cost volume, based on features corresponding to the coordinates. Additionally, the memory 32 contains various application programs, such as a distance estimation program to execute a distance estimation process.

The processor 33, which is an example of a control unit, includes one or more processors and a peripheral circuit thereof. The processor 33 may further include another operating circuit, such as a logic-arithmetic unit, an arithmetic unit, or a graphics processing unit.

Figure 3:
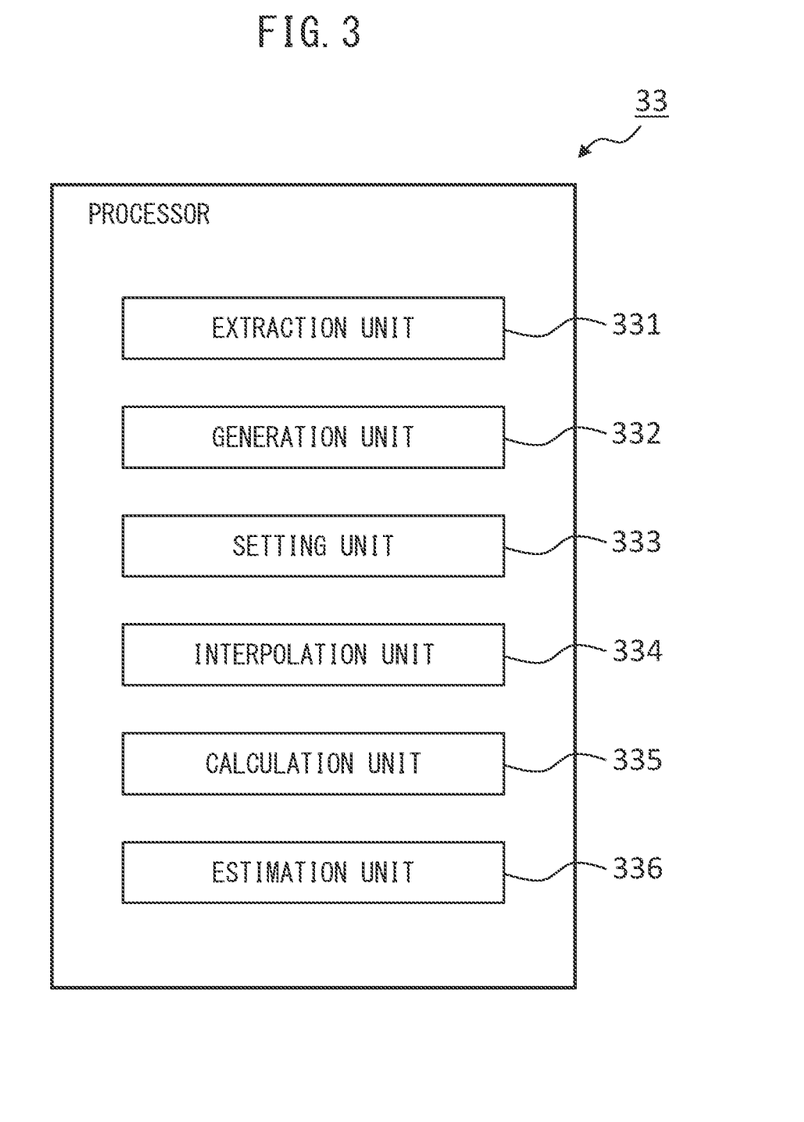
FIG. 3 is a functional block diagram of a processor included in the ECU.

FIG. 3 is a functional block diagram of the processor 33 included in the ECU 3.

As its functional blocks, the processor 33 of the ECU 3 includes an extraction unit 331, a generation unit 332, a setting unit 333, an interpolation unit 334, a calculation unit 335, and an estimation unit 336. These units included in the processor 33 are functional modules implemented by a computer program stored in the memory 32 and executed by the processor 33. The computer program for achieving the functions of the units of the processor 33 may be provided in a form recorded on a computer-readable and portable medium, such as a semiconductor memory, a magnetic medium, or an optical medium. Alternatively, the units included in the processor 33 may be implemented in the ECU 3 as separate integrated circuits, microprocessors, or firmware.

The extraction unit 331 extracts a reference feature map from a reference image generated by a reference camera. The reference feature map represents features corresponding to respective pixels included in the reference image. The extraction unit 331 also extracts source feature maps from one or more source images respectively generated by one or more source cameras. Each source feature map represents features of respective pixels included in a corresponding source image.

Figure 4:
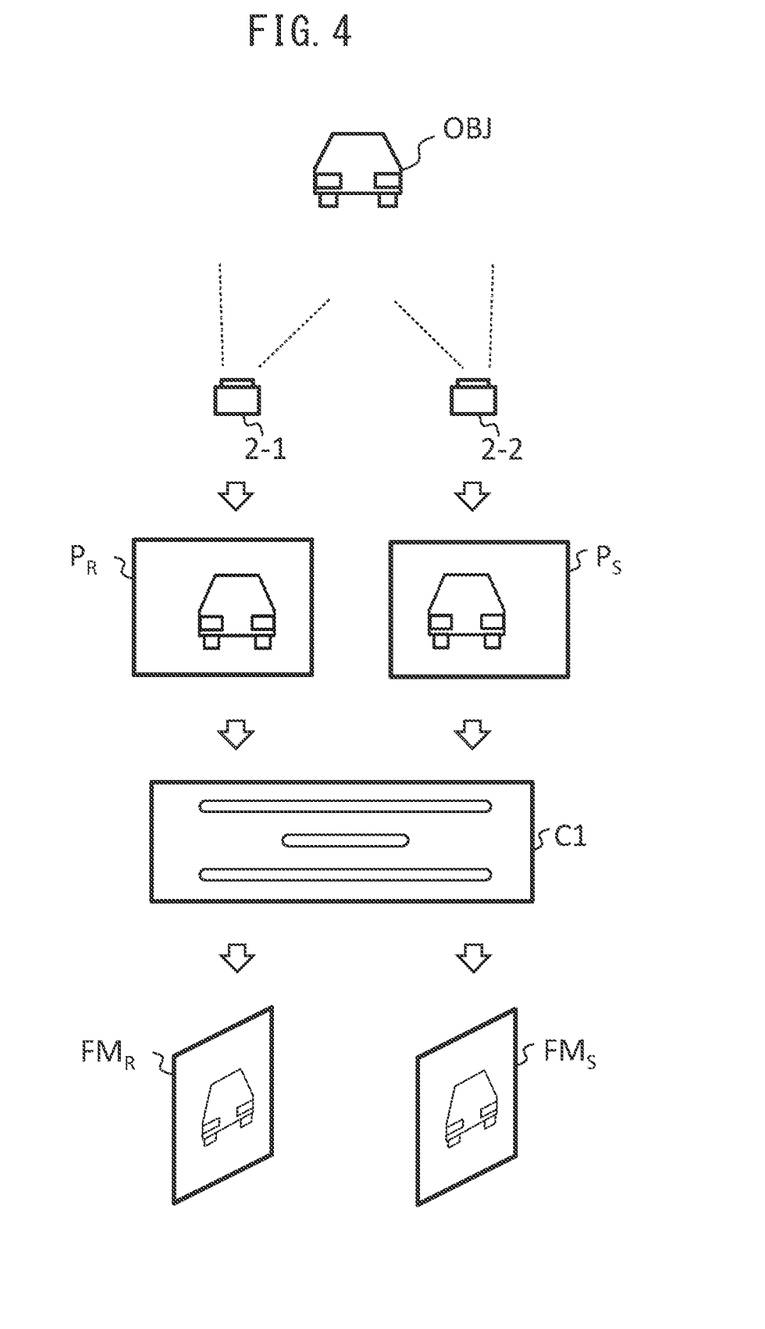
FIG. 4 is a diagram for explaining extraction of feature maps.

FIG. 4 is a diagram for explaining extraction of feature maps.

The left camera 2-1 and the right camera 2-2 mounted on the vehicle 1 take a picture of an object OBJ, and respectively output a reference image $P_R$ and a source image $P_S$ that represent the object OBJ. In the description of the present embodiment, the left camera 2-1 is assumed to be a reference camera for generating the reference image $P_R$, and the right camera 2-2 is assumed to be a source camera for generating the source image $P_S$; however, these cameras may be interchanged. In the case that the cameras 2 include three or more cameras, one of the cameras is a reference camera and the other cameras are first, second, and other source cameras. The location of the left camera 2-1 corresponds to the reference position. The right camera 2-2 is disposed at a position different from the reference position.

The extraction unit 331 inputs the reference image $P_R$ and the source image $P_S$ into a classifier C1 to extract a reference feature map $FM_R$ representing features corresponding to respective pixels included in the reference image $P_R$ and a source feature map $FM_S$ representing features corresponding to respective pixels included in the source image $P_S$. The reference feature map $FM_R$ and the source feature map $FM_S$ are depth maps that have the same length and width as the reference image $P_R$ and the source image $P_S$ and whose pixels indicate estimated distances to an object represented in respective pixels of the reference image $P_R$ and the source image $P_S$. The classifier C1 may be, for example, a convolutional neural network (CNN) including convolution layers connected in series from the input toward the output, such as Multi-Scale Deep Network. A CNN that has been trained in accordance with a predetermined training technique, such as backpropagation, using images having pixels associated with depths as training data operates as the classifier C1 to extract features of respective pixels from an image.

The reference feature map $FM_R$ and the source feature map $FM_S$ may be segmentation maps in which the pixels of the reference image $P_R$ and the source image $P_S$ are classified into classes such as "road," "human," and "vehicle." To output such feature maps, the classifier C1 may be, for example, a CNN such as SegNet.

Figure 5:
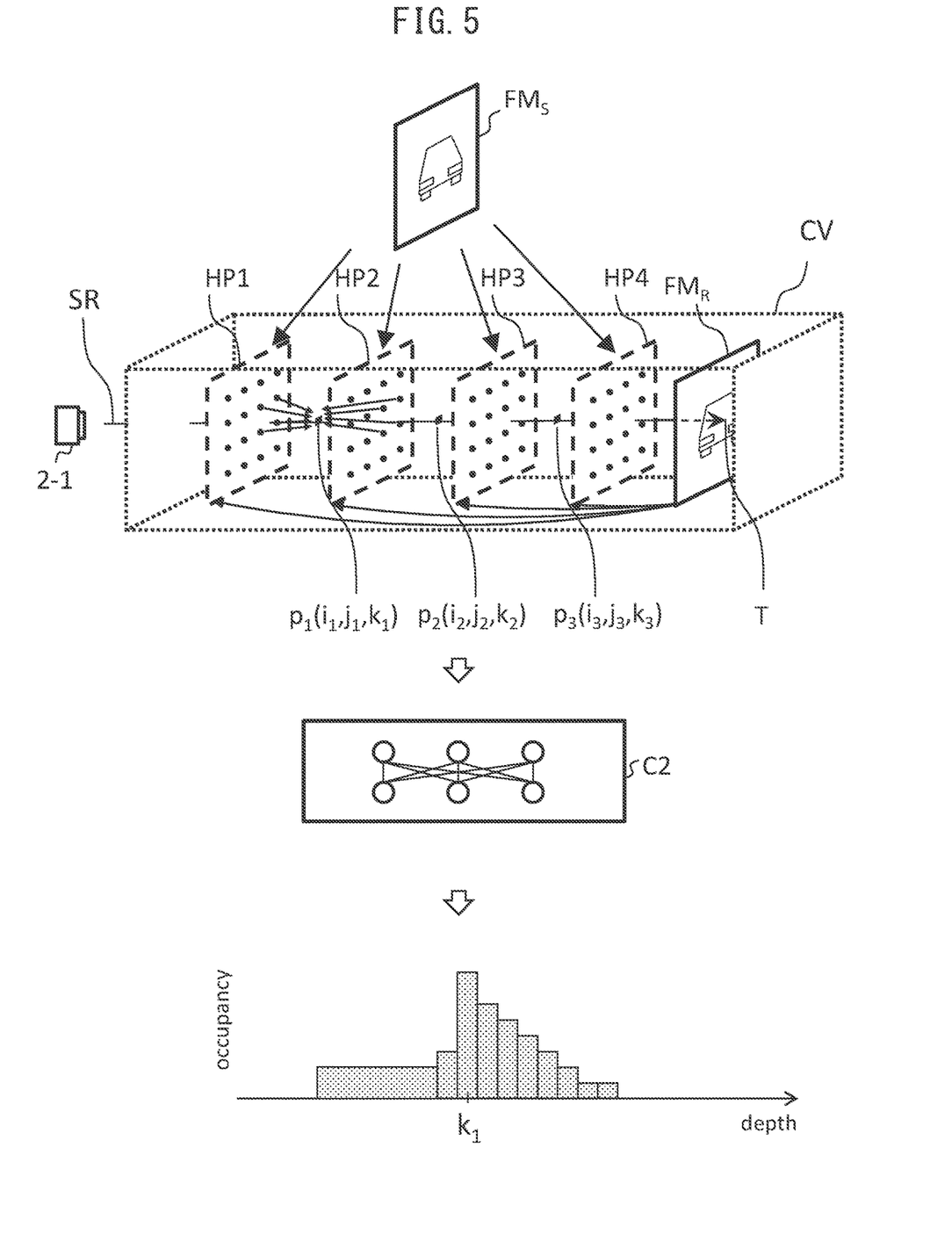
FIG. 5 is a diagram for explaining estimation of distance with the feature maps.

FIG. 5 is a diagram for explaining estimation of distance with the feature maps.

The generation unit 332 transforms the features in the reference feature map $FM_R$ corresponding to respective pixels included in the reference image $P_R$ so that the features in the reference feature map correspond to respective pixels of an image corresponding to an image surface of the left camera 2-1 for the case that the image surface is moved in the direction of an optical axis of the left camera 2-1, thereby hypothetically disposing hypothetical planes HP1 to HP4 between the location of the left camera 2-1, which is the viewpoint of the reference image $P_R$, and the object OBJ. The hypothetical planes HP1 to HP4 are orthogonal to the optical axis of the left camera 2-1 and disposed at different distances from the location of the left camera 2-1. On each of the hypothetical planes HP1 to HP4, the features in the reference feature map $FM_R$ corresponding to respective pixels included in the reference image $P_R$ are arranged in an area reduced or enlarged according to the distance from the location of the left camera 2-1.

The generation unit 332 projects the source feature map $FM_S$ onto each of the hypothetical planes to generate a cost volume. The cost volume includes coordinates on the hypothetical planes. These coordinates are associated with features depending on the difference between the features in the reference feature map $FM_R$ and those in the source feature map $FM_S$. The present embodiment illustrates an example in which four hypothetical planes are disposed; however, the number of hypothetical planes is not limited thereto.

The generation unit 332 executes homography transformation of the source feature map $FM_S$ onto the positions of the hypothetical planes HP1 to HP4 to project the source feature map $FM_S$ onto the hypothetical planes HP1 to HP4. The generation unit 332 generates a cost volume CV including features depending on the features in the source feature map $FM_S$ projected onto the hypothetical planes HP1 to HP4. In the case that there are multiple source images and corresponding source feature maps, each coordinate included in the cost volume CV is associated with features depending on the respective source feature maps.

The setting unit 333 sets sampling points $p_1$, $p_2$, and $p_3$ on a ray in the cost volume CV (sampling ray SR) extending from the location of the left camera 2-1 in a direction corresponding to a target pixel T, which is one of the pixels included in the reference image $P_R$.

The setting unit 333 sets sampling points densely near one of the hypothetical planes such that the depth indicated by a feature associated with coordinates on the hypothetical plane near the sampling ray SR is closest to the depth at which the hypothetical plane is disposed.

The setting unit 333 may set sampling points on the sampling ray SR at regular intervals or at random intervals.

For each of the sampling points $p_1$, $p_2$, and $p_3$, the interpolation unit 334 interpolates a feature corresponding to the sampling point, using features associated with coordinates near the sampling point and on some of the hypothetical planes disposed near the sampling point in the cost volume CV.

The following describes interpolation of a feature corresponding to the sampling point $p_1$ as an example; however, features of the other sampling points can be interpolated similarly. The interpolation unit 334 first identifies hypothetical planes close to the sampling point $p_1$. The sampling point $p_1$ is set at a position whose lateral and vertical coordinates are $i_1$ and $j_1$, respectively, on a plane at a depth $k_1$ parallel to the reference feature map $FM_R$, and denoted by $p_1(i_1, j_1, k_1)$. The interpolation unit 334 identifies a hypothetical plane having a maximum depth of not more than $k_1$, and a hypothetical plane having a minimum depth of not less than $k_1$.

On the identified hypothetical planes, the interpolation unit 334 identifies coordinates close to the sampling point $p_1(i_1, j_1, k_1)$. The identified coordinates are, for example, ones whose lateral coordinate is a maximum of not more than ii and whose vertical coordinate is a maximum of not more than $j_1$, or ones whose lateral coordinate is a maximum of not more than $i_1$ and whose vertical coordinate is a minimum of not less than $j_1$.

The interpolation unit 334 interpolates the feature corresponding to the sampling point $p_1(i_1, j_1, k_1)$, for example, by trilinear interpolation, using features associated with the coordinates on the hypothetical planes close to the sampling point $p_1(i_1, j_1, k_1)$.

The calculation unit 335 inputs features corresponding to the interpolated sampling points into a classifier C2 to calculate occupancy probabilities corresponding to the respective sampling points. An occupancy probability is a probability that coordinates included in the cost volume CV are inside the object OBJ. The classifier C2 is trained to output the occupancy probabilities each depending on a feature corresponding to coordinates on one of the hypothetical planes disposed in the cost volume CV. Training of the classifier C2 will be described below.

The classifier C2 can be configured by a fully-connected neural network including fully-connected layers in which all input values are connected to all output values, such as a multi-layered perceptron.

The calculation unit 335 may weight occupancy probabilities corresponding to the respective sampling points so that an occupancy probability of a sampling point is weightier as the space between a pair of sampling points adjacent to the sampling point (bin size) is wider. This weighting enables the ECU 3 to appropriately process occupancy probabilities corresponding to unevenly set sampling points.

Using bin size $b_i$ obtained by the following Expression (1), the calculation unit 335 weights the occupancy probability corresponding to one of the sampling points $p_i$ set in ascending order of distance from the position of the left camera 2-1, in accordance with the following Expression (2).

$$b_i = \frac{d_{i+1} + d_i}{2} - \frac{d_i + d_{i-1}}{2} \tag{1}$$

$$q_i = \frac{e^{f(p_i)} b_i}{\sum_j e^{f(p_j)} b_j} \tag{2}$$

In Expression (1), $d_i$ denotes the distance from the location of the left camera 2-1 to the sampling point $p_i$. In Expression (2), f(pi) denotes the occupancy probability outputted by the classifier C2 and corresponding to the sampling point $p_i$.

In the case that the sampling points are set at regular intervals, a softmax function may be applied to the occupancy probabilities outputted by the classifier C2 to adjust them so that the sum of the occupancy probabilities of the sampling points equals 1.

The estimation unit 336 adds up products of the occupancy probabilities corresponding to the respective sampling points and the distances from the location of the left camera 2-1 to the corresponding sampling points, and outputs the added value as an estimated distance from the location of the left camera 2-1 to a surface of the object OBJ represented in the target pixel T.

The classifier C2 is trained in accordance with a predetermined training technique, such as backpropagation, using a training reference image and a training source image as training data. The training reference image includes training pixels associated with true values of the depth of a represented object; the training source image is generated by taking a picture of the object from a viewpoint different from that of the training reference image.

A training source feature map extracted from the training source image is projected onto hypothetical planes disposed parallel to the training reference image to generate a training cost volume.

Training sampling points are set on a training sampling ray passing through the viewpoint of the training reference image and a training pixel included in the training reference image. In the present specification, the terms "training sampling point," "training sampling ray," and "training pixel" refer to a sampling point, a sampling ray, and a target pixel used for training the classifier C2, respectively.

The training sampling points are preferably set on the training sampling ray more densely at a location closer to a depth associated with the training pixel. For example, first, a predetermined number of initial training sampling points are set as the training sampling points at a point corresponding to the depth associated with the training pixel and uniformly between predetermined nearest and farthest planes. Additionally, in each bin defined by adjacent initial training sampling points, hierarchical training sampling points are set as the training sampling points; the number of these sampling points is a predetermined number multiplied by the possibility that the bin includes a surface of the object.

At the training stage, the classifier C2 determines occupancy probabilities of the training sampling points set on the training sampling ray. At the training stage, the classifier C2 further adds up products of the distances from the viewpoint of the training reference image to the respective training sampling points and the occupancy probabilities of the corresponding training sampling points to estimate the distance (depth) from the viewpoint of the training reference image to the training pixel.

The classifier C2 is trained so as to reduce the difference between occupancy probabilities (from 0 to 1) depending on input of features at the training sampling points and occupancy states calculated from the depth associated with the training pixel (true value) and the coordinates of the training sampling points. When 0, an occupancy state indicates that a training sampling point is closer to the viewpoint than the surface of the object indicated by the depth (i.e., outside the object); when 1, it indicates that a training sampling point is farther from the viewpoint than the surface of the object (i.e., outside the object). The following Expression (3) is an error function preferably used for training the classifier C2.

$$\mathcal{L} = \lambda_{depth}\mathcal{L}_{depth} + \lambda_{occ}\mathcal{L}_{occ} \tag{3}$$

In Expression (3), $L_{depth}$ denotes the error between the estimated depth and the depth associated with the training pixel (true value); $L_{occ}$ denotes the error between the estimated occupancy probabilities and the occupancy probabilities of the training sampling points (true values), as expressed by Expression (4) below. According to Expression (3), the classifier is trained so as to reduce the difference between the estimated depth and the depth associated with the training pixel (true value) as well as the difference between the estimated occupancy probabilities and the occupancy states at the training sampling points (true values). $\lambda_{depth}$ and $\lambda_{occ}$ are hyperparameters for controlling the effect of training appropriately. For example, ($\lambda_{depth}$, $\lambda_{occ}$) are set at ($1e^{-3}$, 1), and then L is multiplied by $1e^5$, which leads to numerical stability.

$$\mathcal{L}_{occ} = \frac{1}{N_s}\sum_i CE(s(p_i), \gamma\sigma(f(p_i))) \tag{4}$$

In Expression (4), $N_s$ is the number of training sampling points, and CE is a cross entropy function. $s(p_i)$ denotes the occupancy state at the training sampling point $p_i$, and is obtained by dividing the absolute value of the difference between the depth of the training sampling point and the depth associated with the training pixel (true value) by a hyperparameter for controlling the range of the occupancy state and then subtracting the obtained value from 1 (the minimum is 0). $s(p_i)$ approaches 1 as the depth of the training sampling point $p_i$ approaches the true depth; it approaches 0 as the depth deviates from the true depth.

In Expression (4), $f(p_i)$ denotes the occupancy probability of the training sampling point $p_i$ outputted by the classifier C2; $\sigma(\ )$ is a sigmoid function; and $\gamma$ is a trainable scalar value to adjust the scale difference between $L_{occ}$ (occupancy loss) and $L_{depth}$ (depth loss).

At estimating the depth of the training object at a training pixel in training of the classifier C2, the coordinates values of the training sampling points may be modified with values set for each training pixel. For example, at inferring the depth of a training pixel (x, y, z), the coordinates ($x_i$, $y_i$, $z_i$) of a training sampling point set on a training sampling ray passing through the training pixel are modified with values ($x_a$, $y_a$, $z_a$) set for the training pixel (x, y, z) as follows: ($x_i+x_a$, $y_i+y_a$, $z_i+z_a$). Modification of the coordinate values of the training sampling points to be inputted into the classifier C2 results in prevention of overfitting of the classifier C2.

Figure 6:
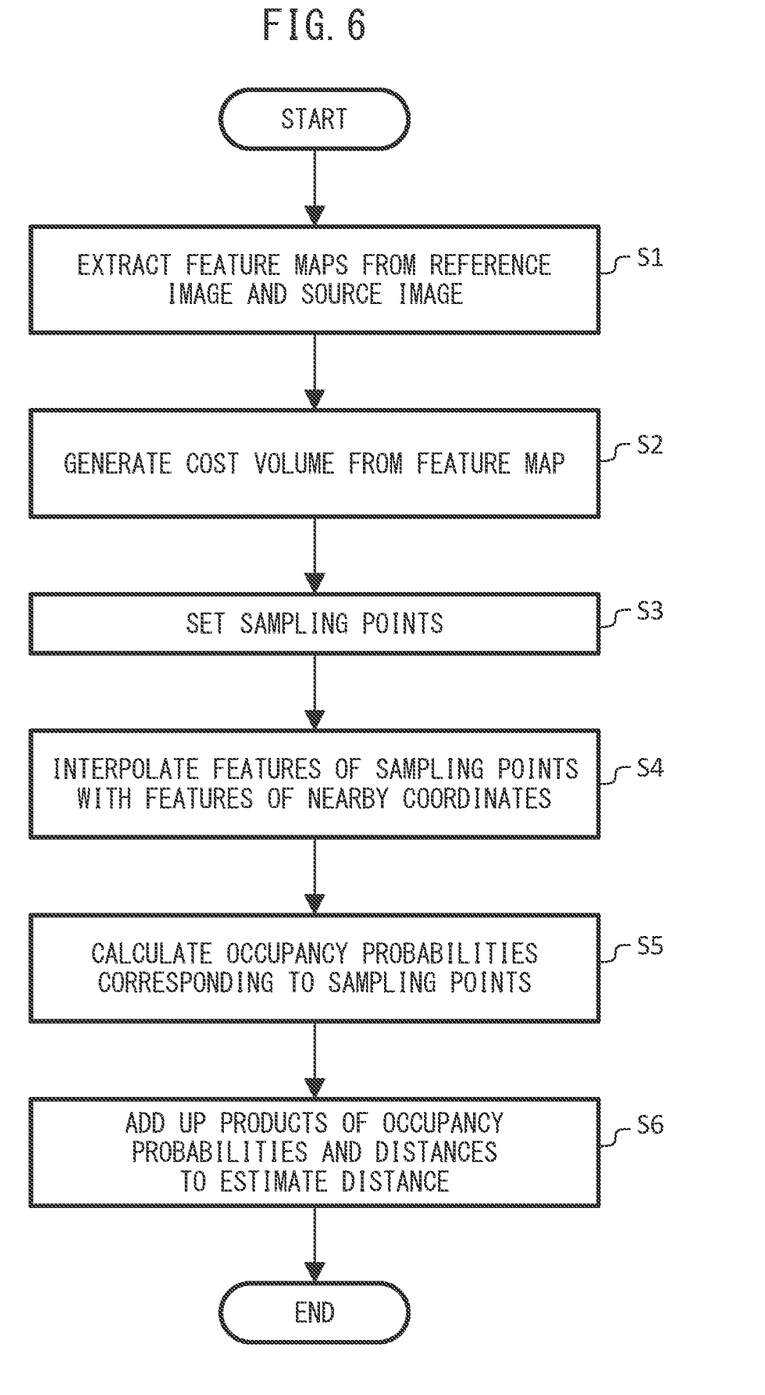
FIG. 6 is a flowchart of a distance estimation process.

FIG. 6 is a flowchart of a distance estimation process. The ECU 3 executes the distance estimation process in response to input of a reference image $P_R$ and one or more source images $P_S$.

The extraction unit 331 of the ECU 3 extracts a reference feature map $FM_R$ from the reference image $P_R$ and extracts a source feature map $FM_S$ from each of the one or more source images $P_S$ (step S1).

The generation unit 332 of the ECU 3 then projects the source feature map $FM_S$ onto hypothetically disposed hypothetical planes to generate a cost volume CV (step S2).

The setting unit 333 of the ECU 3 then sets sampling points on a ray extending from the location of the left camera 2-1 in a direction corresponding to one of pixels included in the reference image $P_R$ (step S3).

For each of the sampling points, the interpolation unit 334 of the ECU 3 then interpolates a feature corresponding to the sampling point, using features associated with coordinates near the sampling point and on some of the hypothetical planes disposed near the sampling point in the cost volume CV (step S4).

The calculation unit 335 of the ECU 3 then inputs features corresponding to the interpolated sampling points into the classifier C2 to calculate occupancy probabilities corresponding to the respective sampling points (step S5).

The estimation unit 336 of the ECU 3 then adds up products of the occupancy probabilities corresponding to the respective sampling points and the distances from the location of the left camera 2-1 to the corresponding sampling points to estimate the distance from the location of the left camera 2-1 to a surface of an object (step S6), and terminates the distance estimation process.

By executing the distance estimation process in this way, the ECU 3 processes space including an object as a neural network without using voxels corresponding to the object. Thus the ECU 3 can estimate the distance to an object of complex shape appropriately with relatively small memory capacity.

The ECU 3 executes the distance estimation process at different times, and estimates the distances to a surface of an object at the respective times. The ECU 3 identifies the positions of the vehicle 1 at the respective times, based on positioning signals received at different times by a global navigation satellite system (GNSS) receiver (not shown) mounted on the vehicle 1. The ECU 3 estimates the positions of the object at the respective times, based on the identified positions of the vehicle 1, the estimated distances to the surface of the object, the mounted positions of the cameras 2, the directions of their focusing optical systems, and their focal lengths. From the positions of the object at these times, the ECU 3 calculates the moving speed of the object during an interval therebetween, and predicts the position of the object in the future later than the last of these times. The ECU 3 generates a trajectory of the vehicle 1 lest a future distance between the vehicle 1 and the object fall below a predetermined distance threshold, and outputs a control signal to a travel mechanism (not shown) of the vehicle 1. The travel mechanism includes, for example, an engine or a motor for accelerating the vehicle 1, brakes for decelerating the vehicle 1, and a steering mechanism for steering the vehicle 1.

The travel control of the vehicle 1 described above is an example of usage of the distance to an object estimated by the distance estimation process of the present disclosure; the estimated distance can also be used for other processes. The apparatus for estimating distance need not be mounted on a vehicle, and may be used for estimating the distance to an object other than objects around a vehicle.

Note that those skilled in the art can apply various changes, substitutions, and modifications without departing from the spirit and scope of the present disclosure.

What is claimed is:

1. An apparatus for estimating distance, comprising a processor configured to:
    extract a reference feature map from a reference image generated by a reference camera for taking a picture of an object from a predetermined reference position, the reference feature map representing features corresponding to respective pixels included in the reference image;
    extract a source feature map from each of one or more source images respectively generated by one or more source cameras for taking a picture of the object from a position different from the reference position, the source feature map representing features of respective pixels included in the source image;
    project the source feature map onto hypothetical planes to generate a cost volume in which coordinates on the hypothetical planes are associated with features, the hypothetical planes being hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera;
    set sampling points on a ray in the cost volume extending from the reference position in a direction corresponding to one of the pixels included in the reference image;
    interpolate, for each of the sampling points, a feature corresponding to the sampling point, using features associated with coordinates near the sampling point and on some of the hypothetical planes disposed near the sampling point in the cost volume;
    calculate occupancy probabilities corresponding to the respective sampling points by inputting features corresponding to the interpolated sampling points into a classifier, the classifier being trained to output the occupancy probabilities each depending on a feature corresponding to coordinates on one of the hypothetical planes and indicating how likely the coordinates are inside the object; and
    add up products of the occupancy probabilities corresponding to the respective sampling points and the distances from the reference position to the corresponding sampling points to estimate the distance from the reference position to a surface of the object.

2. The apparatus according to claim 1, wherein in the calculation, the processor weights occupancy probabilities corresponding to the respective sampling points so that an occupancy probability of a sampling point is weightier as the space between a pair of sampling points adjacent to the sampling point is wider.

3. The apparatus according to claim 1, wherein the classifier is trained so as to reduce the difference between occupancy probabilities estimated for training sampling points set on a training sampling ray in a training cost volume and an occupancy state calculated from a depth associated with a training pixel, the training cost volume being generated with training data including a training reference image and a training source image that represent a training object and that are captured from different viewpoints, the training sampling ray extending from a viewpoint of the training reference image in a direction corresponding to the training pixel, the training pixel being one of pixels included in the training reference image and being associated with the depth of the represented training object.

4. The apparatus according to claim 3, wherein the training sampling points are set more densely at a location closer to the depth associated with the training pixel.

5. The apparatus according to claim 3, wherein the classifier is trained so as to reduce the difference between the occupancy probabilities estimated for the training sampling points and the occupancy state of the training pixel as well as the difference between the depth of the training object calculated from the occupancy probabilities estimated for the training sampling points and the depth associated with the training pixel.

6. The apparatus according to claim 3, wherein the classifier is trained with the occupancy probabilities estimated for the training sampling points whose coordinate values are modified with values set for the training pixel.

7. A method for estimating distance, comprising:
    extracting a reference feature map from a reference image generated by a reference camera for taking a picture of an object from a predetermined reference position, the reference feature map representing features corresponding to respective pixels included in the reference image;

extracting a source feature map from each of one or more source images respectively generated by one or more source cameras for taking a picture of the object from a position different from the reference position, the source feature map representing features of respective pixels included in the source image;

projecting the source feature map onto hypothetical planes to generate a cost volume in which coordinates on the hypothetical planes are associated with features, the hypothetical planes being hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera;

setting sampling points on a ray in the cost volume extending from the reference position in a direction corresponding to one of the pixels included in the reference image;

interpolating, for each of the sampling points, a feature corresponding to the sampling point, using features associated with coordinates near the sampling point and on some of the hypothetical planes disposed near the sampling point in the cost volume;

calculating occupancy probabilities corresponding to the respective sampling points by inputting features corresponding to the interpolated sampling points into a classifier, the classifier being trained to output the occupancy probabilities each depending on a feature corresponding to coordinates on one of the hypothetical planes and indicating how likely the coordinates are inside the object; and adding up products of the occupancy probabilities corresponding to the respective sampling points and the distances from the reference position to the corresponding sampling points to estimate the distance from the reference position to a surface of the object.

8. A non-transitory computer-readable medium containing a computer program for estimating distance, the computer program causing a computer to execute a process comprising:

extracting a reference feature map from a reference image generated by a reference camera for taking a picture of an object from a predetermined reference position, the reference feature map representing features corresponding to respective pixels included in the reference image;

extracting a source feature map from each of one or more source images respectively generated by one or more source cameras for taking a picture of the object from a position different from the reference position, the source feature map representing features of respective pixels included in the source image;

projecting the source feature map onto hypothetical planes to generate a cost volume in which coordinates on the hypothetical planes are associated with features, the hypothetical planes being hypothetically disposed by transforming the features in the reference feature map corresponding to respective pixels included in the reference image so that the features in the reference feature map correspond to respective pixels of an image corresponding to an image surface of the reference camera for the case that the image surface is moved in the direction of an optical axis of the reference camera;

setting sampling points on a ray in the cost volume extending from the reference position in a direction corresponding to one of the pixels included in the reference image;

interpolating, for each of the sampling points, a feature corresponding to the sampling point, using features associated with coordinates near the sampling point and on some of the hypothetical planes disposed near the sampling point in the cost volume;

calculating occupancy probabilities corresponding to the respective sampling points by inputting features corresponding to the interpolated sampling points into a classifier, the classifier being trained to output the occupancy probabilities each depending on a feature corresponding to coordinates on one of the hypothetical planes and indicating how likely the coordinates are inside the object; and adding up products of the occupancy probabilities corresponding to the respective sampling points and the distances from the reference position to the corresponding sampling points to estimate the distance from the reference position to a surface of the object.

* * * * *